(12) United States Patent
Shieh et al.

(10) Patent No.: US 9,898,257 B2
(45) Date of Patent: Feb. 20, 2018

(54) AUTOMATIC PROBE CONSTRUCTION SYSTEM AND METHOD THEREOF

(71) Applicant: National Chiao Tung University, Hsinchu (TW)

(72) Inventors: Shiuhpyng Shieh, Hsinchu (TW); Chi-Wei Wang, Hsinchu (TW); Chia-Wei Wang, Hsinchu (TW); Chia-Wei Hsu, Hsinchu (TW)

(73) Assignee: NATIONAL CHIAO TUNG UNIVERSITY, Hsinchu (TW)

( * ) Notice: Subject to any disclaimer, the term of this patent is extended or adjusted under 35 U.S.C. 154(b) by 83 days.

(21) Appl. No.: 15/016,120

(22) Filed: Feb. 4, 2016

(65) Prior Publication Data

US 2017/0083291 A1 Mar. 23, 2017

(30) Foreign Application Priority Data

Sep. 23, 2015 (TW) .............................. 104131390 A (51) Int. Cl.
| | |
|---|---|
| G06F 9/44 | (2006.01) |
| G06F 9/45 | (2006.01) |
| G06F 9/455 | (2018.01) |
| G06F 11/30 | (2006.01) |
| G06F 21/55 | (2013.01) |

(52) U.S. Cl.
CPC .................. *G06F 8/30* (2013.01); *G06F 8/20* (2013.01); *G06F 8/433* (2013.01); *G06F 9/45558* (2013.01); *G06F 11/30* (2013.01); *G06F 21/55* (2013.01); *G06F 2009/45587* (2013.01); *G06F 2009/45591* (2013.01); *G06F 2221/034* (2013.01)

(58) Field of Classification Search
CPC ............... G06F 8/20; G06F 8/30; G06F 8/433
USPC ......................................... 717/106, 132, 156
See application file for complete search history.

(56) References Cited

U.S. PATENT DOCUMENTS 7,735,067 B1 * 6/2010 Leventhal ........... G06F 11/3644
717/127
2015/0154192 A1 * 6/2015 Lysne ...................... G06N 5/00
707/748

OTHER PUBLICATIONS

Wang, Chi-Wei, "ProbeBuilder—Automating Probe COnstruction in Virtual Machine Introspection through Uncovering Opaque Kernel Data Structures", 2013.*
Wang et al., "ProbeBuilder: Uncovering Opaque Kernel Data Structures for Automatic Probe Construction", 2016.*

(Continued)

*Primary Examiner* — Phillip H Nguyen (57) ABSTRACT

An automatic probe construction system and the method thereof are provided. The automatic probe construction system includes a data dereference analysis module, a probe selection module, and a probe verification module. The data dereference analysis module dereferences a plurality of target data of an electronic apparatus according to a plurality of pointers, and constructs a plurality of candidate probes. The probe selection module constructs a control flow graph according to the candidate probes and an instruction code of an executable image file, to select via the control flow graph from the candidate probes at least one dedicated probe. The probe verification module searches the executable image file for an instruction code corresponding to the dedicated probe, to verify the dedicated probe. Therefore, the dedicated probe can be constructed automatically, and the number of the dedicated probes is thus limited.

12 Claims, 8 Drawing Sheets

(56) References Cited

OTHER PUBLICATIONS

Wang et al., "ProbeBuilder: Uncovering Opaque Kernal Data Structures for Automatice Probe Construction", "IEEE Transactions on Dependable and Secure Computing", , 17 Pages, vol. PP, No. 99, Publisher: IEEE.

* cited by examiner

```
 1    dedicated probe: 0x804e7461(ESP, <+12, +36, +52>)     ← PC
                          A     B    C
 2    int gen_probe_804e7461 (unsigned char* buf, size_t len)
                          A     B                  C
 3    {
 4        int ret = 0;
              B
 5        target_ulong ptr = env->regs[R_ESP];
 6        unsigned int offset[]= {12, 36, 52};
                               F
 7        unsigned int offsets = 3;
 8        int i;
 9        for (i = 0; i < offsets-1; ++i) {
10            if ((ret=cpu_memory_rw_debug (env, ptr+offset[i], &ptr, sizeof(ptr), 0)) != 0)
11                return ret;
12        }
13        if ((ret=cpu_memory_rw_debug(env, ptr+offset[i], buf, len, 0)) != 0)
14            return ret;
15        return 0;
16    }
```

C1 brackets lines 4–7; C2 brackets lines 12–15.

FIG. 7

AUTOMATIC PROBE CONSTRUCTION SYSTEM AND METHOD THEREOF

BACKGROUND OF THE INVENTION

1. Field of the Invention

This disclosure relates to a probe construction technique, and, more particularly, to an automatic probe construction system and an automatic probe construction method.

2. Description of Related Art

Information security is an inevitable need for every enterprise or organization.

Therefore, industrial and academic circles have made a great amount of effort in analyzing malicious programs.

Currently, a probe mechanism is one of the most popular mechanisms to monitor and sniff behaviors of an operating system. However, the existing probes are heavily relied on human labors to conduct a reverse engineering to realize analysis of the operating system. Further, in order to implement a probe corresponding to a core data structure of an operating system that is not published, such as the Microsoft operating system, engineers have to conduct a reverse engineering on an unpublished core data structure.

However, the above engineering is heavily relied on human labors, and the results of the reverse engineering lack practicability. When the environment in which the operating system runs is changed or the edition of the operating system is changed, the engineers have to conduct the reverse engineering once again, which wastes a great amount of labor costs and time resources.

Therefore, how to solve the problems of the prior art is becoming one of the most urgent issues in the art.

SUMMARY OF THE INVENTION

The present disclosure provides an automatic probe construction system and an automatic probe construction method, which construct dedicated probes automatically, and limit the number of the dedicated probes.

In an embodiment, the automatic probe construction system comprises: a data dereference analysis module that dereferences a plurality of target data of an electronic apparatus according to a plurality of pointers, and constructs a plurality of candidate probes for a certain event; a probe selection module that constructs a control flow graph according to the candidate probes and an instruction code of an executable image file of the electronic apparatus, and selects via the control flow graph at least one dedicated probe from the candidate probes for the certain event; and a probe verification module that searches the executable image file of the electronic apparatus for an instruction code that corresponds to the dedicated probe to verify the dedicated probe.

In another embodiment, the automatic probe construction method comprises: dereferencing, by a data dereference analysis module, a plurality of target data of an electronic apparatus according to a plurality of pointers, and constructing a plurality of candidate probes for a certain event; constructing a control flow graph according to the candidate probes and an instruction code of an executable image file of the electronic apparatus, to select via the control flow graph from the candidate probes at least one dedicated probe for the certain event; and searching, by a probe verification module, the executable image file of the electronic apparatus for an instruction code corresponding to the dedicated probe to verify the dedicated probe.

In an embodiment, each of the pointers has a base of a storage module of the electronic apparatus or the base added with at least one offset, to allow the data dereference analysis module to dereference the target data according to the bases and the offsets of the pointers and construct the candidate probes.

In another embodiment, the data dereference analysis module determines whether at least one base of a storage module of the electronic apparatus includes a valid address, and further verifies that data of the pointer constituted by the base or the base added with at least one offset is the target data if it is determined that the at least one base includes the valid address, to allow the data dereference analysis module to dereference the target data and construct the candidate probes.

In yet another embodiment, the control flow graph is constituted by a plurality of nodes and edges that connect the nodes, and the nodes represent the candidate probes and the instruction code of the executable image file for the certain event.

In further another embodiment, the probe selection module selects at least one leading node from the nodes of the candidate probes and removes the leading node and edges thereof, to select at least one dedicated node as the dedicated probe.

In another embodiment, the probe verification module searches via a data flow trace method the executable image file for an instruction code corresponding to the dedicated probe according to the target data, the pointer, the base and the offset of the dedicated probe, to verify the dedicated probe.

In another embodiment, the automatic probe construction system further comprises an instruction code generation module that generates a probe instruction code according to the verified dedicated probe, the probe instruction code having an instruction code of the verified dedicated probe and an instruction code that dereferences the target data.

In an automatic probe construction system and an automatic probe construction method according to the present disclosure, a plurality of target data of an electronic apparatus are dereferenced according to a plurality of pointers; a plurality of candidate probes are constructed for a certain event; at least one dedicated probe is selected from the candidate probes; and an instruction code is searched from the executable image file to verify the dedicated probe. Therefore, the dedicated probe can be constructed automatically, and the number of the dedicated probe is decreased significantly.

In addition, the dedicated probes according to the present disclosure can be used to sniff the behaviors of malicious programs during a dynamic execution process, and have the probe instruction codes that can be installed in, for example, a virtual machine monitor (VMM) to obtain the target data and act as a sniffing tool. The probe instruction code of the dedicated probe is stealthy, and can be prevented from being interfered and damaged by malicious programs.

Further, an automatic probe construction system and an automatic probe construction method according to the present disclosure can be applied to a variety of technical fields, such as telecommunication, cloud services, antivirus software or related searching units, to facilitate the establishment of an information security system.

BRIEF DESCRIPTION OF DRAWINGS

The present disclosure can be more fully understood by reading the following detailed descriptions of the preferred embodiments, with reference made to the accompanying drawings, wherein.

DETAILED DESCRIPTION OF THE INVENTION

The following illustrative embodiments are provided to illustrate the disclosure of the present disclosure. These and other advantages and effects can be apparently understood by those in the art after reading the disclosure of this specification. The present disclosure can also be performed or applied by other different embodiments. The details of the specification may be on the basis of different points and applications, and numerous modifications and variations can be devised without departing from the spirit of the present disclosure.

Figure 1:
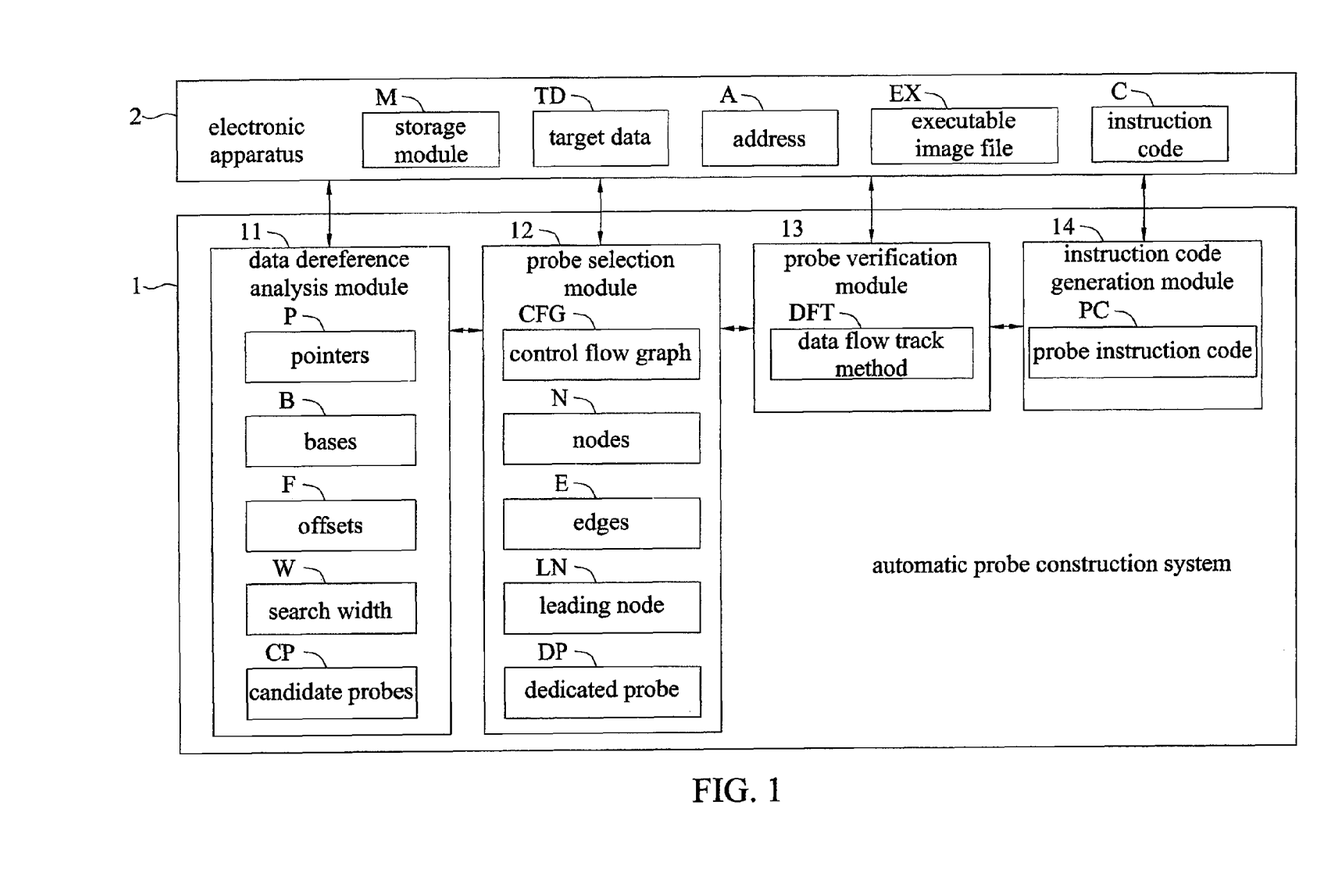
FIG. 1 is a functional block diagram of an automatic probe construction system of an embodiment according to the present disclosure.
Figure 2:
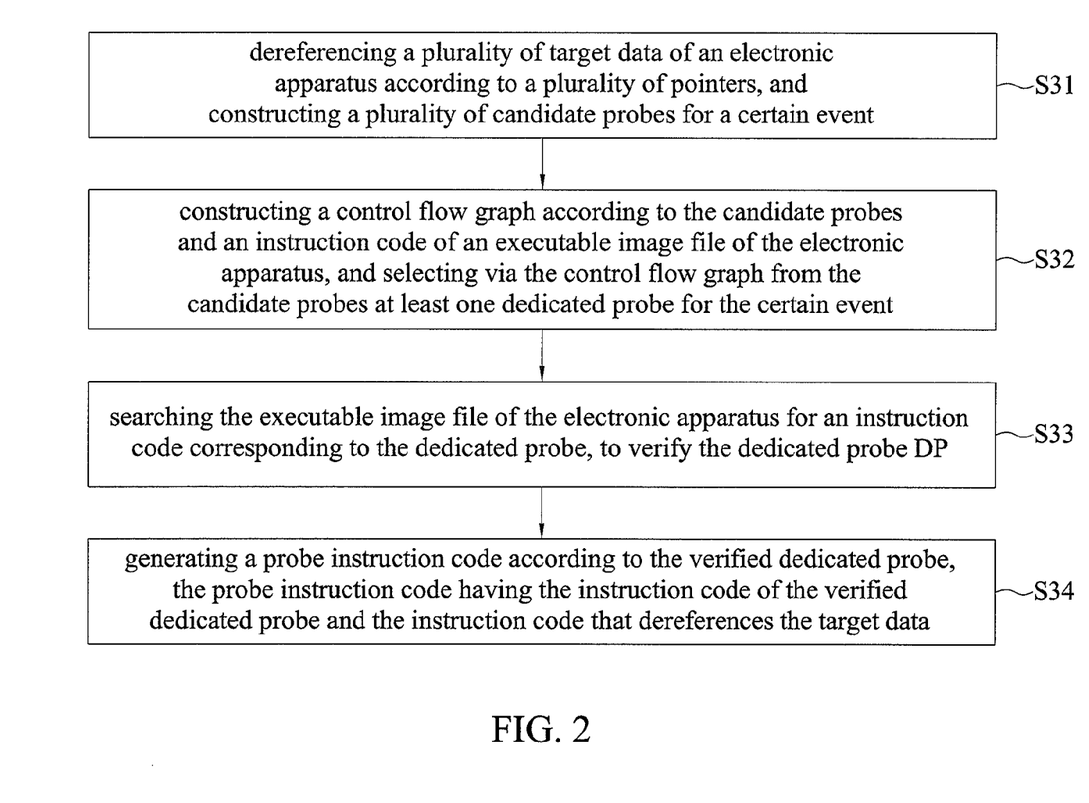
FIG. 2 is a flow chart of an automatic probe construction method of an embodiment according to the present disclosure.

FIG. 1 is a functional block diagram of an automatic probe construction system 1 of an embodiment according to the present disclosure. FIG. 2 is a flow chart of an automatic probe construction method of an embodiment according to the present disclosure.

As shown in FIGS. 1 and 2, the automatic probe construction system 1 can be installed in a virtual machine monitor (VMM), a computer, a server, or a mobile device, and comprises a data dereference analysis module 11, a probe selection module 12, a probe verification module 13, and an instruction code generation module 14.

The automatic probe construction system 1 performs the automatic probe construction method, which comprises: step S31, in which the data dereference analysis module 11 dereferences a plurality of target data TD of a storage module M of an electronic apparatus 2 automatically according to a plurality of pointers, and constructs a plurality of candidate probes CP for a certain event; step S32, in which the probe selection module 12 constructs a control flow graph CFG automatically according to the candidate probes CP and an instruction code C of an executable image file EX of the electronic apparatus 2, and selects via the control flow graph CFG from the candidate probes CP at least one dedicated probe DP for the certain event; step S33, in which the probe verification module 13 searches the executable image file EX of the electronic apparatus 2 for an instruction code C corresponding to the dedicated probe DP, to verify the dedicated probe DP; and step S34, in which the instruction code generation module 14 generates a probe instruction code PC automatically according to the verified dedicated probe DP, the probe instruction code PC having the instruction code C of the verified dedicated probe DP and the instruction code C that dereferences the target data TD.

Each of the pointers P may have a base B of the storage module M of the electronic apparatus 2 or the base B added with an offset F, to allow the data dereference analysis module 11 to dereference the target data TD according to the bases B and the offsets F of the pointers P, and construct the candidate probes CP.

The electronic apparatus 2 may be a guest unit, a virtual machine (VM), a computer, a server, or a mobile device (e.g., a smart phone). The storage module M may be a memory, a register, or a disk drive. The target data TD may be data that can be used for the certain event, data in which users are interested, or data accessed by malicious programs. The certain event may be program creation, file creation, registry creation, program termination, file removal, or registry removal of the executable image file EX. The executable image file EX may be, but not limited to an operating system (.sys file) or an executable file (.exe file) of the electronic apparatus 2.

Figure 3A:
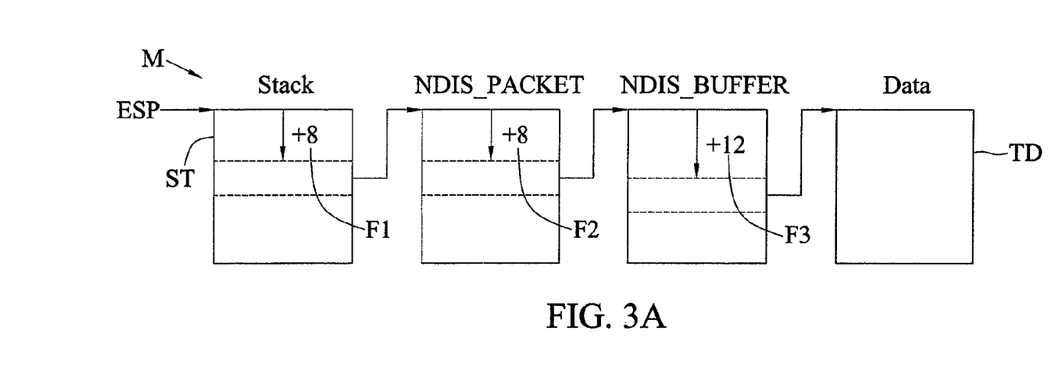
FIG. 3A illustrates that target data are dereferenced from a storage module of an electronic apparatus in an automatic probe construction system and an automatic probe construction method according to the present disclosure.
Figure 3B:
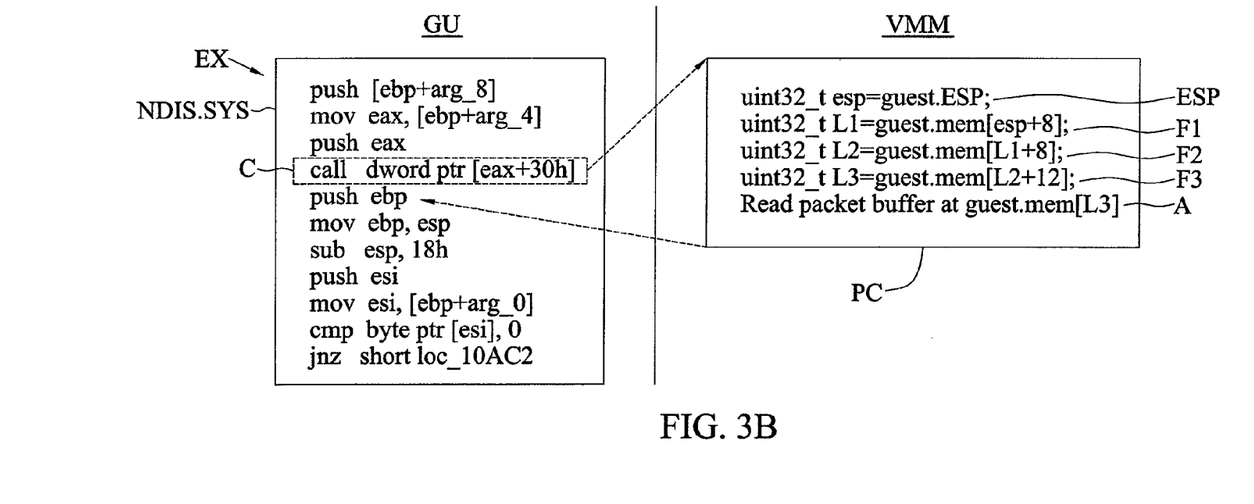
FIG. 3B illustrates that an instruction code is executed in an electronic apparatus (e.g., a guest unit) and a virtual machine monitor in an automatic probe construction system and an automatic probe construction method according to the present disclosure.

FIG. 3A illustrates that the target data TD are dereferenced from the storage module M of the electronic apparatus 2 in the automatic probe construction system 1 and the automatic probe construction method according to the present disclosure. FIG. 3B illustrates that the instruction code C is executed in the electronic apparatus (e.g., a guest unit) 2 and the virtual machine monitor VMM in the automatic probe construction system 1 and the automatic probe construction method according to the present disclosure.

As shown in FIG. 3A and FIG. 1, the target data TD are dereferenced from the storage module M of the electronic apparatus 2 as follows: the data dereference analysis module 11 takes the ESP of the storage module M (e.g., the register) as a base B, and takes the base B added with at least one offset F as a pointer P. The target data TD are dereferenced from the storage module M of the electronic apparatus 2 according to the pointer P. In FIG. 3A, the at least one offset F includes offsets F1, F2 and F3 located in the stack ST, NDIS_PACKET and NDIS_BUFFER, respectively.

As shown in FIG. 3B and FIG. 1, the instruction code C is executed in the electronic apparatus 2 (e.g., the guest unit GU) and the virtual machine monitor VMM as follows: when the executable image file EX (e.g., NDIS.SYS) of the guest unit GU is executing the instruction code C "call dword ptr [eax+30h]", the executable image file EX pauses executing the instruction codes C following the instruction code C, and the instruction code C triggers the virtual machine monitor VMM to execute the probe instruction code PC of the dedicated probe DP; and after the probe instruction code PC is executed, the executable image file EX restores executing the instruction code following the instruction code C.

In an embodiment, the probe instruction code PC shown in FIG. 3B is the instruction code C that dereferences the target data TD in FIG. 3A, and the instruction code of the base ESP, the instruction code of the offsets F1-F3, and the instruction code of an address A of the target data TD shown in FIG. 3B correspond to the base ESP, the offsets F1-F3, and the address A of the target data TD shown in FIG. 3A, respectively.

Figure 4:
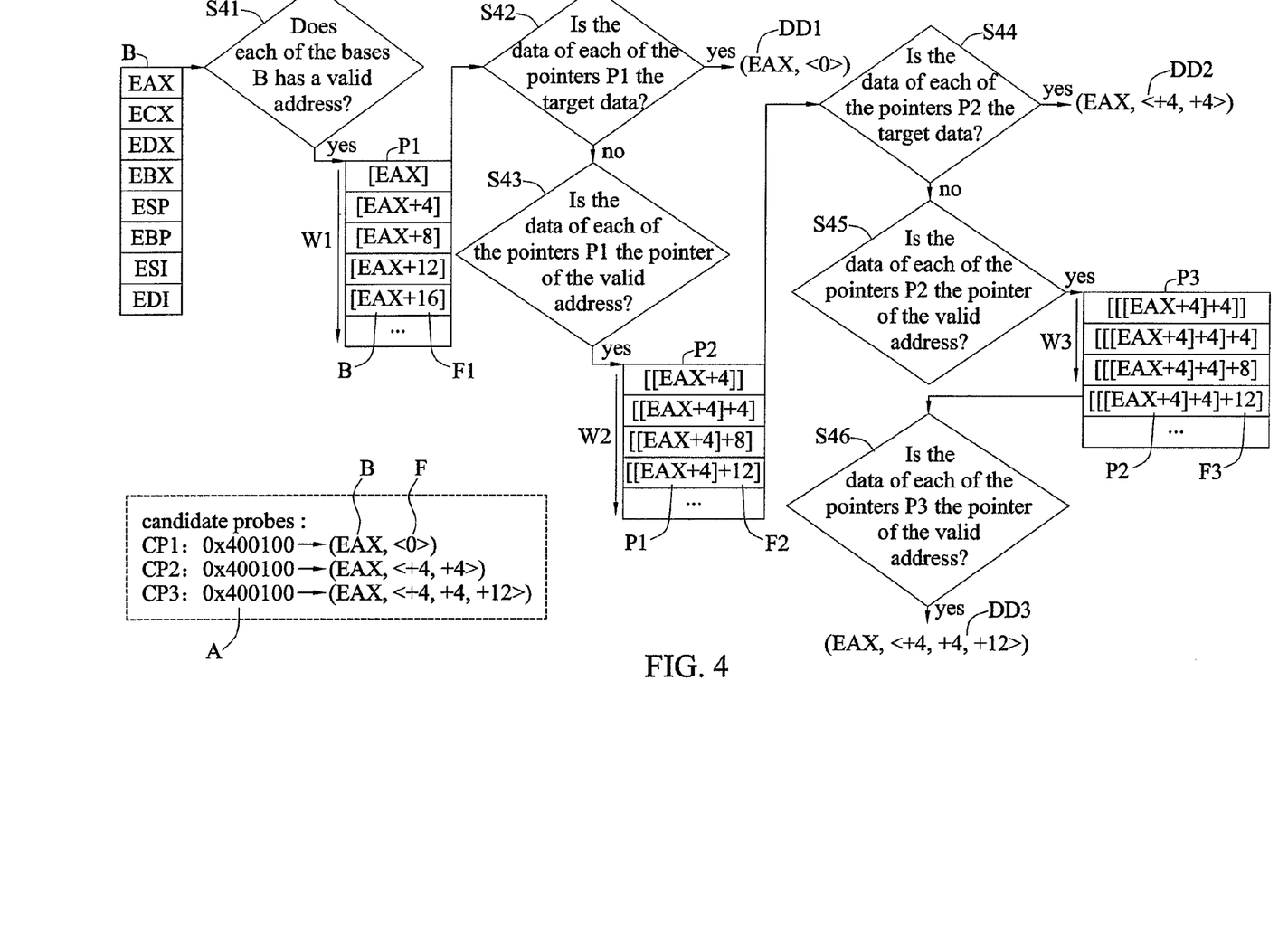
FIG. 4 is a flow chart illustrating construction of a plurality of candidate probes in an automatic probe construction system and an automatic probe construction method according to the present disclosure.

FIG. 4 is a flow chart illustrating construction of a plurality of candidate probes CP in the automatic probe construction system 1 and the automatic probe construction method according to the present disclosure.

As shown in FIG. 4 and FIG. 1, the candidate probes CP are constructed as follows: the data dereference analysis module 11 determines whether at least one base B of the storage module M of the electronic apparatus 2 has a valid address A; and the data dereference analysis module 11 verifies that data of the pointer P constituted by the base B or the base B added with at least one offset F are the target data TD if it is determined that the base B has the valid address A, for the data dereference analysis module 11 to dereference the target data TD and construct the candidate probe CP.

In the embodiment shown in FIG. 4, a plurality of bases B (e.g., EAX, ECX, EDX, EBX, ESP, EBP, ESI and EDI) of the storage module M of the electronic apparatus 2 may be acquired first. In the meantime, in step S41, the data dereference analysis module 11 determines whether the bases B have a valid address A one by one, and takes each of the bases B added with a predetermined fold (e.g., 4) of the offset F1 as a plurality of pointers P1 according to the searching width W (W1) if it is determined that the bases B have a valid address A.

In step S42, the data dereference analysis module 11 determines whether the pointers P1 are target data TD one by one, and executes a data dereference process DD1 (e.g., (EAX, <0>)) if it is determined that the pointers P1 are the target data TD, to dereference the target data TD of the storage module M of the electronic apparatus 2 and construct at least one candidate probe CP1 (e.g., 0x400100→(EAX, <0>)) that is used for the certain event, wherein the candidate probe CP1 has an address A (e.g., 0x400100), a base (e.g., EAX), and an offset (e.g., <0>). If it is determined that the pointers P1 are not the target data TD, in step S43, the data dereference analysis module 11 determines whether data of the pointers P1 are pointers A of valid addresses A one by one, and takes the pointers P1 added with a predetermined fold (e.g., 4) of the offset F2 as a plurality of pointers P2 if it is determined that the data of the pointers P1 are the pointers A of the valid addresses A.

In step S44, the data dereference analysis module 11 determines whether data of the pointers P1 are the target data TD, and executes a data dereference process DD2 (e.g., (EAX, <+4, +4>)) if it is determined that the data of the pointers P1 are the target data TD, to dereference the target data TD of the storage module M of the electronic apparatus 2 and construct at least one candidate probe CP2 (e.g., 0x400100→(EAX, <+4, +4>)) that is used for the certain event, wherein the candidate probe CP2 has an address A (e.g., 0x400100), a base B (e.g., EAX) and an offset F (e.g., <+4, +4>). If it is determined that the data of the pointers P1 are not the target data TD, in step S45, the data dereference analysis module 11 determines whether the data of the pointers P2 are the pointers P of valid addresses A one by one, and takes the pointers P2 added with a predetermined fold (e.g., 4) of the offsets F2 as a plurality of pointers P3 according to a searching width W (W3).

In step S46, the data dereference analysis module 11 determines whether data of the pointers P3 are the target data TD one by one, and executes a data dereference process DD3 (e.g., (EAX, <+4, +4, +12>)) if it is determined that the data of the pointers P3 are the target data TD, to dereference the target data TD of the storage module M of the electronic apparatus 2 and construct at least one candidate probe CP3 (e.g., 0x400100→(EAX, <+4, +4, +12>)) that is used for the certain event, wherein the candidate probe CP3 has an address A (e.g., 0x400100), a base B (e.g., EAX) and an offset F (e.g., <+4, +4, +12>).

FIGS. 5A-5E illustrate a control flow graph, via which at least one dedicated probe DP is selected from a plurality of candidate probes CP in the automatic probe construction system 1 and the automatic probe construction method according to the present invention.

As shown in FIGS. 5A-5E and FIG. 1, the probe selection module 12 selects at least one leading node LN from the nodes N of the candidate probes CP, removes the leading node LN and edges E thereof, and selects at least one dedicate node as the dedicated probe DP.

Figures 5A, 5B, 5C, 5D, 5E:
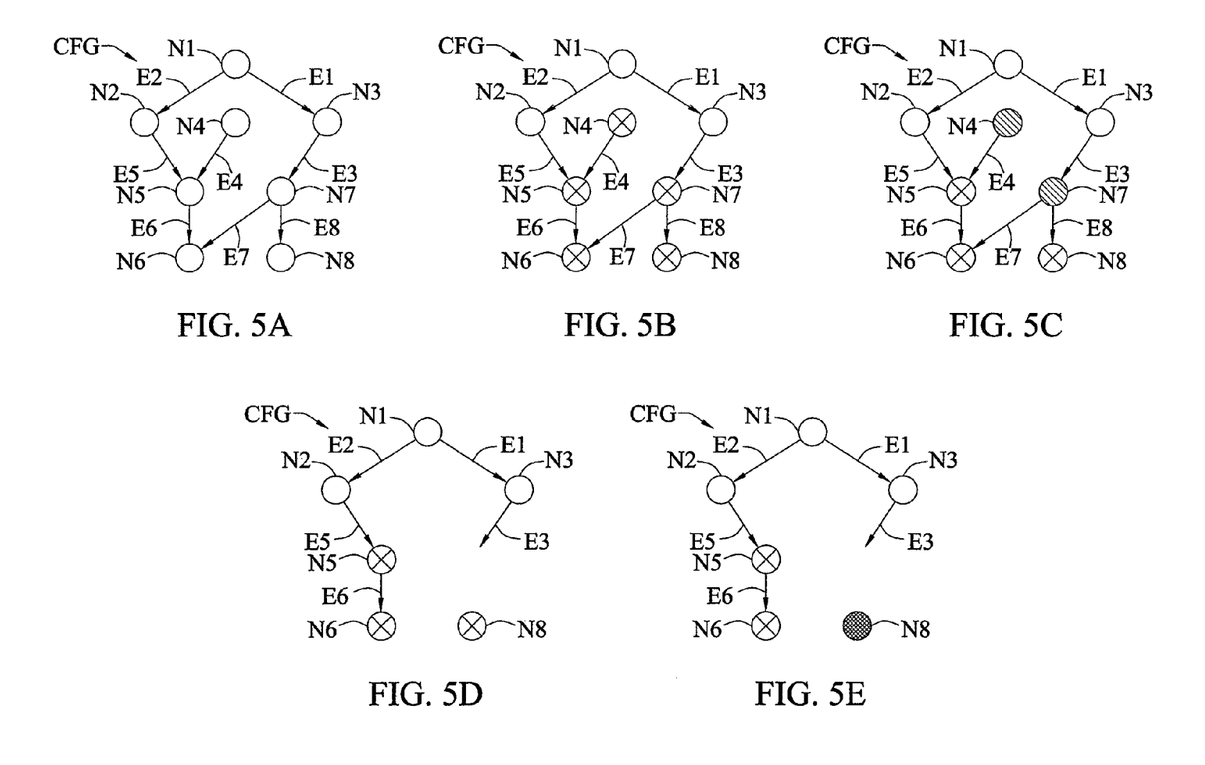
FIGS. 5A-5E illustrate a control flow graph, via which at least one dedicated probe is selected from a plurality of candidate probes in an automatic probe construction system and an automatic probe construction method according to the present disclosure.

In FIG. 5A, the probe selection module 12 constructs a control flow graph CFG according to a plurality of nodes N (e.g., N1-N8) and edges (e.g., E1-E8) that connect the nodes N, the nodes N (e.g., N1-N8) representing the candidate probes CP and an instruction code C of a certain event of the executable image file EX.

In FIG. 5B, the probe selection module 12 selects nodes N (e.g., N4-N8) of the candidate probes CP from the node N (e.g., N1-N8).

In FIG. 5C, the probe selection module 12 selects at least one leading node LN (e.g., N4, N7) from the nodes N (e.g., N4-N8) of the candidate probes CP.

In FIGS. 5D and 5E, the probe selection module 12 removes the leading node LN (e.g., N4, N7) and its edges E (e.g., E4, E7, E8), to select at least one dedicate node (e.g., N8) as the dedicated probe DP.

Figure 6A:
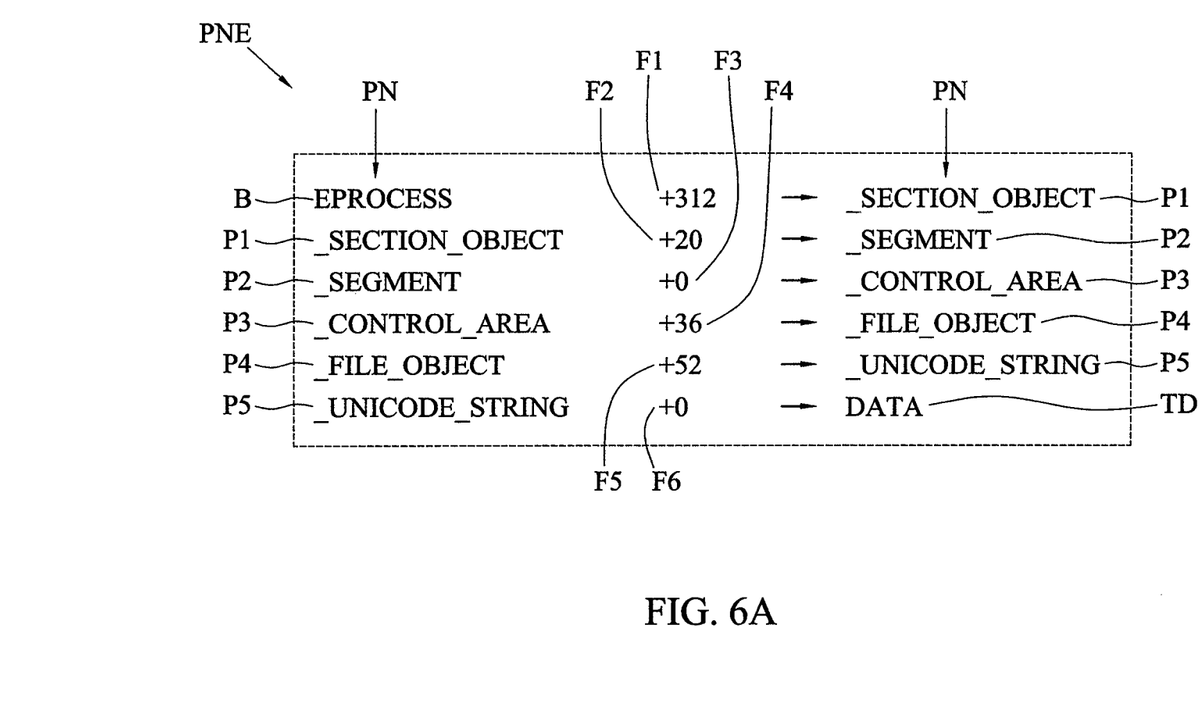
FIG. 6A illustrates a process name extraction of a dedicated probe in an automatic probe construction system and an automatic probe construction method according to the present disclosure.
Figure 6B:
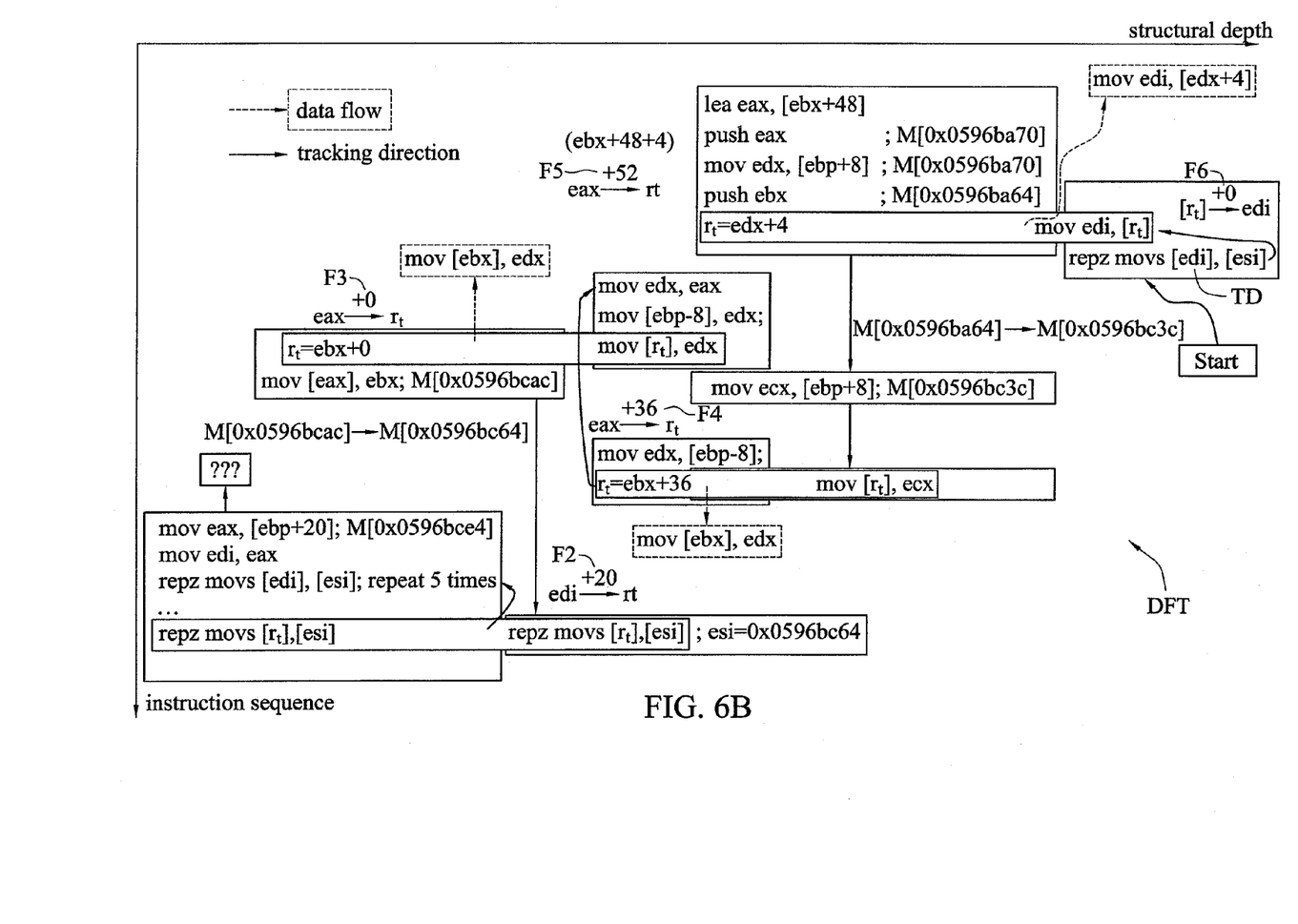
FIG. 6B illustrates verification of a dedicated probe via a data flow trace method in an automatic probe construction system and an automatic probe construction method according to the present disclosure.

FIG. 6A illustrates a process name extraction PNE of a dedicated probe in the automatic probe construction system 1 and the automatic probe construction method according to the present disclosure. FIG. 6B illustrates verification of a dedicated probe via a data flow trace method DFT in the automatic probe construction system 2 and the automatic probe construction method according to the present disclosure.

As shown in FIG. 6A and FIG. 1, the process name extraction PNE relating to the dedicated probe DP is: (1) taking a process name PN "EPROCESS" as a base B, and taking the base B added with an offset F1 "+312" as a pointer P1 of a process name PN "_SECTION_OBJECT"; (2) taking the pointer P1 of the process name PN "_SECTION_OBJECT" added with an offset F2 "+20" as a pointer P2 of a process name PN "_SEGMENT"; (3) taking the pointer P2 of the process name PN "_SEGMENT" added with an offset F3 "+0" as a pointer P3 of a process name PN "_CONTROL_AREA"; (4) taking the pointer P3 of the process name PN "_CONTROL_AREA" added with an offset F4 "+36" as a pointer P4 of a process name PN "_FILE_OBJECT"; (5) taking the pointer P4 of the process name PN "_FILE_OBJECT" added with an offset F5 "+52" as a pointer P5 of a process name PN "_UNICODE_STRING"; (6) and dereferencing the target data TD of the storage module M of the electronic apparatus 2 with the pointer P5 of the process name PN "_UNICODE_STRING added with an offset F6 "+0".

As shown in FIG. 6B and FIG. 1, the dedicated probe DP is verified via the data flow trace method DFT as follows: the probe verification module 13 searches, via the data flow trace method DFT, the executable image file EX for an instruction code C corresponding to the dedicated probe DP according to the target data TD, the address A, the pointer P, the base B and the offset F of the dedicated probe DP, to verify the dedicated probe DP.

In one embodiment, from the "Start" shown in the lower right portion of FIG. 6B, the target data TD of FIG. 6A are dereferenced from the addresses [edi] of the instruction codes "repz movs [edi], [esi]" of the executable image file EX first, and a plurality of instruction codes C are searched or inferred inversely from the executable image file EX through the data flow trace method DFT and a tracking direction (referring to a dashed arrow "-->" and a solid arrow "→"), wherein the instruction codes C correspond to the address A of the dedicated probe DP, and the process name PN, the offsets F6-F1 and pointers P5-P1 shown in FIG. 6A, to verify the validity or practicability of the dedicated probed DP. FIG. 6B differs from FIG. 6A in that FIG. 6B shows the offsets F6-F2 corresponding to FIG. 6A and a portion of the instruction codes, without showing the process name PN, the offset F1 and the pointers P5-P1 corresponding to FIG. 6A. Both FIG. 6A and FIG. 6B do not show the address A of the dedicated probe DP.

Figure 7:
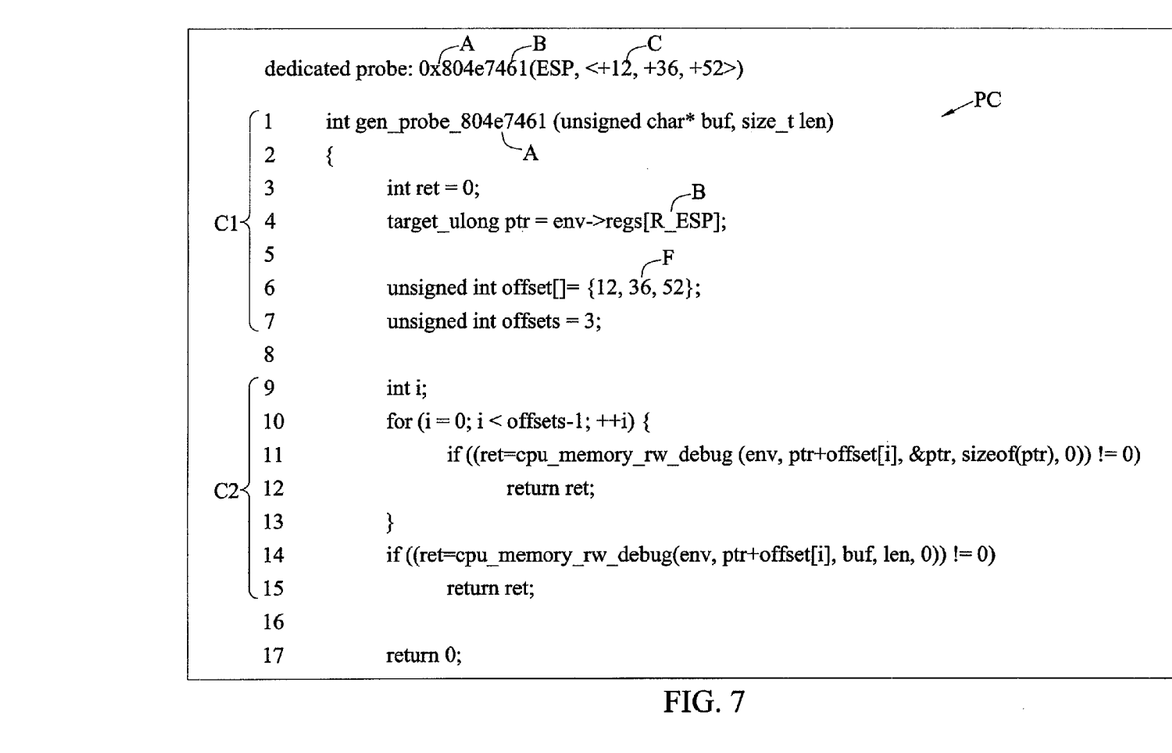
FIG. 7 illustrates a probe instruction code of a dedicated probe in an automatic probe construction system and an automatic probe construction method according to the present disclosure.

FIG. 7 illustrates a probe instruction code of a dedicated probe in the automatic probe construction system 1 and the automatic probe construction method according to the present disclosure.

As shown in FIG. 7 and FIG. 1, the probe instruction code PC of the dedicated probe DP is constructed as follows: the instruction code generation module 14 generates the probe instruction code PC according to the dedicated probe DP. In FIG. 7, lines 1-7 of the probe instruction code PC are the instruction code C1 of the dedicated probe DP, and lines 9-15 are the instruction code C2 that dereferences the target data TD. The probe instruction code PC may be installed, but not limited to a virtual machine monitor VMM, such as QEMU and Xen.

It is known from the above that in an automatic probe construction system and an automatic probe construction method according to the present disclosure, a plurality of target data of an electronic apparatus are dereferenced according to a plurality of pointers to construct a plurality of candidate probes that are used for a certain event, at least one dedicated probe is selected from the candidate probes, and an executable image file is searched for an instruction code, to verify the dedicated probe. Therefore, the present disclosure can construct the dedicated probes automatically, and limit the number of the dedicated probes significantly.

In addition, the dedicated probes according to the present disclosure can be used to sniff the behaviors of malicious programs during a dynamic execution process, and have the probe instruction codes that can be installed in, for example, a virtual machine monitor (VMM) to obtain the target data and act as a sniffing tool. The probe instruction code of the dedicated probe is stealthy, and can be prevented from being interfered and damaged by malicious programs.

Further, an automatic probe construction system and an automatic probe construction method according to the present disclosure can be applied to a variety of technical fields, such as telecommunication, cloud services, antivirus software or related searching units, to facilitate the establishment of an information security system.

The foregoing descriptions of the detailed embodiments are only illustrated to disclose the features and functions of the present disclosure and not restrictive to the scope of the present disclosure. It should be understood to those skilled in the art that all modifications and variations according to the spirit and principle in the disclosure of the present disclosure should fall within the scope of the appended claims.

What is claimed is:

1. An automatic probe construction system, comprising:
at least one processor configured to:
dereference a plurality of target data of a storage module of an electronic apparatus according to a plurality of pointers, and construct a plurality of candidate probes for a certain event;
construct a control flow graph according to the candidate probes and an instruction code of an executable image file of the electronic apparatus, and select via the control flow graph at least one dedicated probe from the candidate probes for the certain event;
search the executable image file of the electronic apparatus for an instruction code corresponding to the dedicated probe to verify the dedicated probe;
generate a probe instruction code according to the verified dedicated probe, the probe instruction code having an instruction code of the verified dedicated probe and an instruction code dereferencing the target data; and
wherein the verified dedicated probe is configured to sniff behaviors of malicious programs during a dynamic execution process.

2. The automatic probe construction system of claim 1, wherein each of the pointers has a base of the storage module of the electronic apparatus or the base added with at least one offset, allowing the processor to dereference the target data according to the bases and the offsets of the pointers and construct the candidate probes.

3. The automatic probe construction system of claim 1, wherein the processor is configured to determine whether at least one base of the storage module of the electronic apparatus includes a valid address, and verify data of the pointer constituted by the base or the base added with at least one offset as the target data if the at least one base is determined to include the valid address, allowing the processor to dereference the target data and construct the candidate probes.

4. The automatic probe construction system of claim 1, wherein the control flow graph is constituted by a plurality of nodes and edges connecting the nodes, and the nodes represent the candidate probes and the instruction code of the executable image file for the certain event.

5. The automatic probe construction system of claim 4, wherein the processor selects at least one leading node from the nodes of the candidate probes and removes the leading node and edges of the leading node to select at least one dedicated node as the dedicated probe.

6. The automatic probe construction system of claim 2, wherein the processor searches via a data flow trace method the executable image file for the instruction code corresponding to the dedicated probe according to the target data, the pointer, the base and the offset of the dedicated probe to verify the dedicated probe.

7. An automatic probe construction method, comprising:
dereferencing, by at least one processor, a plurality of target data of a storage module of an electronic apparatus according to a plurality of pointers, and constructing a plurality of candidate probes for a certain event;
constructing, by the processor, a control flow graph according to the candidate probes and an instruction code of an executable image file of the electronic apparatus to select via the control flow graph from the candidate probes at least one dedicated probe for the certain event;

searching, by the processor, the executable image file of the electronic apparatus for an instruction code corresponding to the dedicated probe to verify the dedicated probe;

generating, by the processor, a probe instruction code according to the verified dedicated probe, the probe instruction code having an instruction code of the verified dedicated probe, and an instruction code dereferencing the target data; and wherein the verified dedicated probe is configured to sniff behaviors of malicious programs during a dynamic execution process.

8. The automatic probe construction method of claim 7, wherein each of the pointers has a base of the storage module of the electronic apparatus or the base added with at least one offset, allowing the processor to dereference the target data according to the bases and the offsets of the pointers and construct the candidate probes.

9. The automatic probe construction method of claim 7, further comprising determining whether at least one base of the storage module of the electronic apparatus includes a valid address, and verifying data of the pointer constituted by the base or the base added with at least one offset as the target data if the at least one base is determined to include the valid address, allowing the processor to dereference the target data and construct the candidate probes.

10. The automatic probe construction method of claim 7, wherein the control flow graph is constituted by a plurality of nodes and edges connecting the nodes, and the nodes represent the candidate probes and the instruction code of the executable image file for the certain event.

11. The automatic probe construction method of claim 10, further comprising selecting at least one leading node from the nodes of the candidate probes, and removing the leading node and edges of the leading node to select at least one dedicated node as the dedicated probe.

12. The automatic probe construction method of claim 8, wherein the processor searches via a data flow trace method the executable image file for the instruction code corresponding to the dedicated probe according to the target data, the pointer, the base and the offset of the dedicated probe to verify the dedicated probe.

* * * * *